United States Patent
Osano et al.

(10) Patent No.: US 7,970,933 B2
(45) Date of Patent: Jun. 28, 2011

(54) AD HOC NETWORK, NODE, ROUTING CONTROL METHOD AND ROUTING CONTROL PROGRAM

(75) Inventors: Tomoyuki Osano, Yokosuka (JP); Yoshitaka Uchida, Yokosuka (JP); Norihiro Ishikawa, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 658 days.

(21) Appl. No.: 11/771,413

(22) Filed: Jun. 29, 2007

(65) Prior Publication Data

US 2008/0126565 A1  May 29, 2008

(30) Foreign Application Priority Data

Jun. 30, 2006 (JP) .................. P2006-182457

(51) Int. Cl.
*G06F 15/173* (2006.01)
*H04L 12/28* (2006.01)
*H04M 7/00* (2006.01)

(52) U.S. Cl. ........ 709/242; 709/223; 709/238; 709/243; 370/351; 370/389; 379/216; 379/220.01; 379/221.06

(58) Field of Classification Search .................... 709/242
See application file for complete search history.

(56) References Cited

U.S. PATENT DOCUMENTS

| | | | | |
|---|---|---|---|---|
| 5,884,031 A * | 3/1999 | Ice | ................................ | 709/203 |
| 7,035,933 B2 * | 4/2006 | O'Neal et al. | ................. | 709/233 |
| 7,079,946 B2 * | 7/2006 | Hunzinger | .................... | 701/208 |
| 7,404,002 B1 * | 7/2008 | Pereira | ........................... | 709/231 |
| 7,512,676 B2 * | 3/2009 | O'Neal et al. | ................. | 709/223 |
| 7,707,302 B2 * | 4/2010 | Welck et al. | ................... | 709/231 |
| 7,881,229 B2 * | 2/2011 | Weinstein et al. | ............. | 370/255 |
| 2001/0032271 A1 * | 10/2001 | Allen | ............................. | 709/239 |
| 2003/0026268 A1 * | 2/2003 | Navas | ........................... | 370/400 |
| 2003/0227931 A1 * | 12/2003 | Chen et al. | ..................... | 370/408 |
| 2004/0213167 A1 * | 10/2004 | Garcia-Luna-Aceves et al. | .............................. | 370/254 |
| 2006/0227801 A1 * | 10/2006 | Nanda et al. | .................. | 370/447 |
| 2008/0002599 A1 * | 1/2008 | Yau et al. | ...................... | 370/310 |
| 2008/0034074 A1 * | 2/2008 | Becker | ........................... | 709/223 |
| 2008/0170538 A1 * | 7/2008 | Duggi et al. | ................... | 370/328 |

FOREIGN PATENT DOCUMENTS

| | | |
|---|---|---|
| JP | 2003-516035 | 5/2003 |
| JP | 2005-323346 | 11/2005 |
| WO | WO 01/41380 A2 | 6/2001 |

OTHER PUBLICATIONS

Mao, Weiwei and Ciletti, Michael D. "Correlation-Reduced Scan-path Design to Improve Delay Fault Coverage". 28th ACM/IEEE Design Automation Conference.@1991 ACM 0-89791-395-7/91/0006/0073. pp. 73-79.*

* cited by examiner

*Primary Examiner* — Kevin Bates
*Assistant Examiner* — Angela Nguyen
(74) *Attorney, Agent, or Firm* — Oblon, Spivak, McClelland, Maier & Neustadt, L.L.P.

(57) ABSTRACT

An ad hoc network is configured of a plurality of nodes. The node includes: a link setting unit configured to set a plurality of links to a plurality of adjacent nodes on a one-to-one basis; a Bloom filter storage unit configured to store a Bloom filter in association with each of the links existing in linked destinations, the Bloom filter generated by using, as a key, a node identification uniquely identifying each of the nodes exiting in linked destination; and a data transmitter configured to use the stored Bloom filters as routing information at a time of data transmission.

8 Claims, 7 Drawing Sheets

FIG. 2

{ Hash1 (MOBILE)=1
  Hash2 (MOBILE)=10
  Hash3 (MOBILE)=6

{ Hash1 (AD HOC)=7
  Hash2 (AD HOC)=1
  Hash3 (AD HOC)=6

{ Hash1 (NETWORK)=8
  Hash2 (NETWORK)=3
  Hash3 (NETWORK)=2

|              |                       | BIT STRING |   |   |   |   |   |   |   |   |   |
|--------------|-----------------------|---|---|---|---|---|---|---|---|---|---|
| KEY          | MOBILE                | 1 | 0 | 0 | 0 | 0 | 1 | 0 | 0 | 0 | 1 |
| KEY          | AD HOC                | 1 | 0 | 1 | 0 | 0 | 0 | 1 | 0 | 0 | 0 |
| KEY          | NETWORK               | 0 | 1 | 1 | 0 | 0 | 0 | 0 | 1 | 0 | 0 |
| BLOOM FILTER | MOBILE AD HOC NETWORK | 1 | 1 | 1 | 0 | 0 | 1 | 1 | 1 | 0 | 1 |
| SEARCH KEY   | AD HOC                | 1 | 0 | 1 | 0 | 0 | 0 | 1 | 0 | 0 | 0 |

... BLOOM FILTER

⇨ ... UPDATE REQUEST MESSAGE

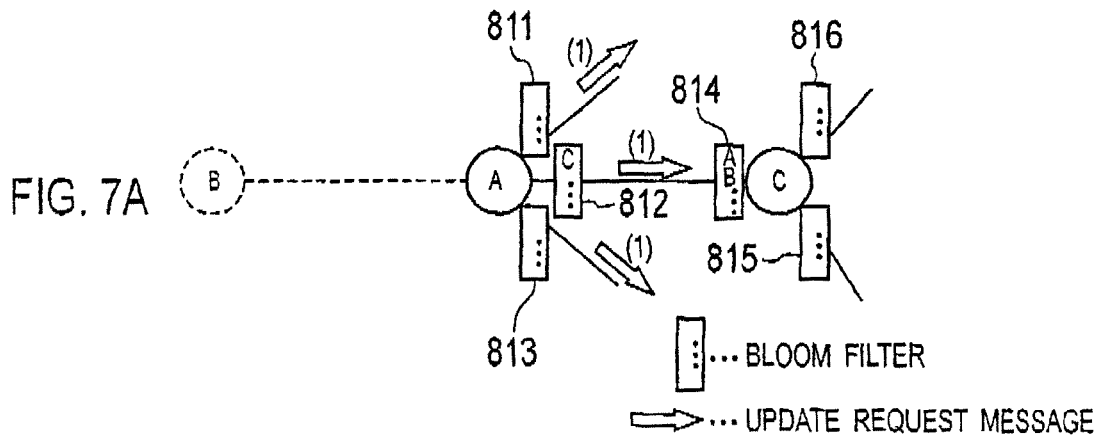
FIG. 7A
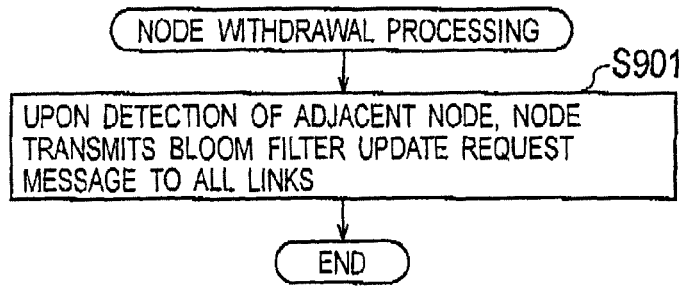
FIG. 7B
FIG. 8
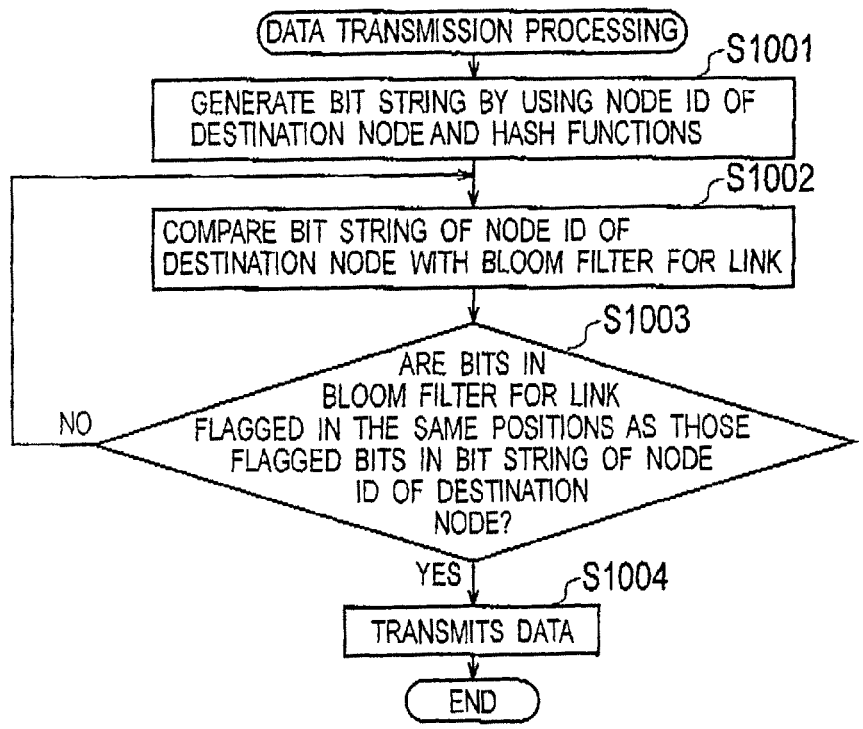

AD HOC NETWORK, NODE, ROUTING CONTROL METHOD AND ROUTING CONTROL PROGRAM

CROSS REFERENCE TO RELATED APPLICATION

This application is based upon and claims the benefit of priority from prior Japanese Patent Application P2006-182457 filed on Jun. 30, 2006; the entire contents of which are incorporated by reference herein.

BACKGROUND OF THE INVENTION

1. Field of the Invention

The present invention relates to an ad hoc network, a node, a routing control method and a routing control program for an ad hoc network configured of a plurality of nodes.

2. Description of the Related Art

In recent years, development and wide spread of mobile communication terminals have been increasing interest in a mobile ad hoc network. The mobile ad hoc network is a network dynamically constructed among mobile communication terminals. The mobile ad hoc network is a network that does not depend on a base station and core network, which are indispensable in a conventional mobile radio communication network, and autonomously constructed by mobile communication terminals.

Expected applied examples include a sensor network, communications during disaster, communications between automobiles, a personal area network, a home network, a temporal network in an event, and a network for information exchanges. In such a communication environment, demands may rise for new types of application implementations such as a service allowing a mobile terminal such as a mobile phone to utilize devices scattered around the terminal, a service operated by a plurality of devices existing in different networks in collaboration and coordination with each other, and the like.

A reactive-type Dynamic Source Routing (DSR), a proactive-type Optimized Link State Routing (OLSR) and the like have been proposed as a routing protocol for a mobile ad hoc network.

The reactive-type DSR is also called an on-demand and type, and starts a route finding process to a communication partner at a starting time of data transmission. This process is terminated when a route is founded, or when examinations of all available route patterns are completed. Once a route is found and established, the route is maintained until it becomes impossible to communicate with the partner therethrough, or until the route itself becomes unnecessary. Since route finding starts after a request to start data transmission is made, communication packets do not generate load on a network when data communication is not performed. On the other hand, some slight delay occurs from when a request to start data transmission is made until data is actually transmitted to a communication partner. In addition, since the route finding process continues until a route is found, or until examinations of all available route patterns are completed, this reactive-type DSR has a disadvantage of producing overheads when finding a communication partner fails.

The proactive-type OLSR is also called a table drive type, and a proactive-type routing protocol standardized by the Internet Engineering Task Force (IETF) is Topology Broadcast Based on Reverse-Path Forwarding (TBRPF). Each node has a table for storing information on routing from the node to other nodes on a network. In response to changes in a network topology, each node updates the routing information in its own table, and ensures consistency between the network topology and the routing information. Since the routing information is periodically exchanged between nodes, a delay does not occur from when a request to start to transmit data is made until the data is actually transmitted to a communication partner. However, since nodes communicate with each other even while not transmitting data, a communication load is placed on the network. Heretofore, how to reduce such a communication load has been studied while examining the frequency of updating routing information and a range of nodes involved in updating routing information. However, the frequency and the range of nodes have a trade-off with efficiency and convenience.

A mobile ad hoc network may include a sensor without power supply, and such a sensor and a mobile terminal have limitations in memory and processing performance. Accordingly, there is a need for a protocol that achieves reduction in overheads at times of transmission and non-transmission of data, and decrease in consumption of CPU resources and the like in a sensor and a mobile terminal.

To be more precise, an achievement of reduction in overheads and delay at the time of data transmission is necessary for a reactive type routing protocol. On the other hand, achievements of reduction in communications traffic between nodes at a time of non-transmission of data, and reduction in an information volume (routing information, etc.) held in each node are desired for a proactive type routing protocol.

SUMMARY OF THE INVENTION

In consideration of the foregoing problems, the present invention provides an ad hoc network, a node, a routing method and a routing control program that are capable of suppressing overheads at times of transmission and non-transmission of data, and decreasing consumption of CPU resources and the like in each node.

A first aspect of the present invention provides an ad hoc network configured of a plurality of nodes. In the ad hoc network, each of the nodes includes a link setting unit, a Bloom filter storage unit and a data transmitter. The link setting unit is configured to set a plurality of links to a plurality of adjacent nodes on a one-tone basis. The Bloom filter storage unit is configured to store a Bloom filter in association with each of the links. Here, the Bloom filer is generated by using, as a key, a node identification uniquely identifying each of the nodes existing in linked destinations. The data transmitter uses the stored Bloom filters as routing information at a time of data transmission.

A second aspect of the present invention provides a node in an ad hoc network configured of a plurality of nodes. The node includes a link setting unit, a Bloom filter storage unit and a data transmitter. The link setting unit is configured to set a plurality of links to a plurality of adjacent nodes on a one-to-one basis. The Bloom filter storage unit is configured to store a Bloom filter in association with each of the links existing in linked destinations. Here, the Bloom filter is generated by using, as a key, a node identification uniquely identifying each of the nodes existing in linked destinations. The data transmitter uses the stored Bloom filters as routing information at a time of data transmission.

A third aspect of the present invention is that the node according to the second aspect further includes an addition processor. When a bit string is received from a participating node that newly participates in the ad hoc network, the addition processor adds the bit string to the Bloom filter storage unit as a Bloom filter corresponding to the link to the participating node. The bit string is one obtained by conversion of the node identification of the participating node.

A fourth aspect of the present invention is related to the node according to the third aspect. The addition processor transmits to the participating node a result of computation carried out by using the Bloom filters of the respective links except the link to the participating node, and using the bit string obtained by conversion of its own node identification.

A fifth aspect of the present invention is that the node according to the second aspect further includes an update request message transmitter. When there is a change in a link to an adjacent node, the update request message transmitter transmits an update request message requesting for Bloom filter update, to each of the links except the changed link.

A sixth aspect of the present invention is that the node according to the second aspect further includes an update processor and an update request message transmitter. When receiving an update request message requesting for Bloom filter update, the update processor judges whether or not to update the stored Bloom filter, and then updates the stored Bloom filter in response to an affirmative judgment result. The update request message transmitter transmits the update request message to each of the links except the link corresponding to the updated Bloom filter.

A seventh aspect of the present invention is related to the node according to the fifth or sixth aspect. When the update request is accepted, the update request message transmitter transmits a result of computation to a node accepting the update request. Here, the computation is carried out by using Bloom filters corresponding to the respective links except the link to the node accepting the update request, and using the bit string obtained by conversion of its own node identification.

An eighth aspect of the present invention is related to the node according to the second aspect. The data transmitter makes a comparison with the stored Bloom filter of each of the links by using, as a search key, a node identification of a destination node to which data is to be transmitted. Then, according to the comparison result, the data transmitter selects a link through which the data is to be transmitted, among the plurality of links.

A ninth aspect of the present invention provides a routing control method applied to an ad hoc network configured of a plurality of nodes. The method includes the steps in which each node sets a plurality of links to a plurality of adjacent nodes on a one-to-one basis; each node stores a Bloom filter in association with each of the links, the Bloom filter generated by using, as a key, a node identification uniquely identifying each of the nodes existing in linked destinations; and each node uses the stored Bloom filters as routing information at a tune of data transmission.

A tenth aspect of the present invention provides a routing control program used for an ad hoc network configured of a plurality of nodes. This program causes each node to executes the steps of: setting a plurality of links to a plurality of adjacent nodes on a one-to-one basis; storing a Bloom filter in association with each of the links, the Bloom filter generated by using, as a key, a node identification uniquely identifying each of the nodes existing in linked destinations; and using the stored Bloom filters as routing information at a time of data transmission.

BRIEF DESCRIPTION OF THE DRAWINGS

FIG. 2 is a schematic diagram for explaining a Bloom filter used in an ad hoc network of the embodiment of the present invention.

FIG. 7A is a network configuration diagram for explaining node withdrawal processing from the ad hoc network according to the embodiment of the present invention.

FIG. 7B is a flowchart of showing a procedure of the node withdrawal processing from the ad hoc network according to the embodiment of the present invention.

FIG. 8 is a flowchart of showing a procedure of the data transmission processing according to the embodiment of the present invention.

DETAILED DESCRIPTION OF THE PREFERRED EMBODIMENTS

Figure 1A:
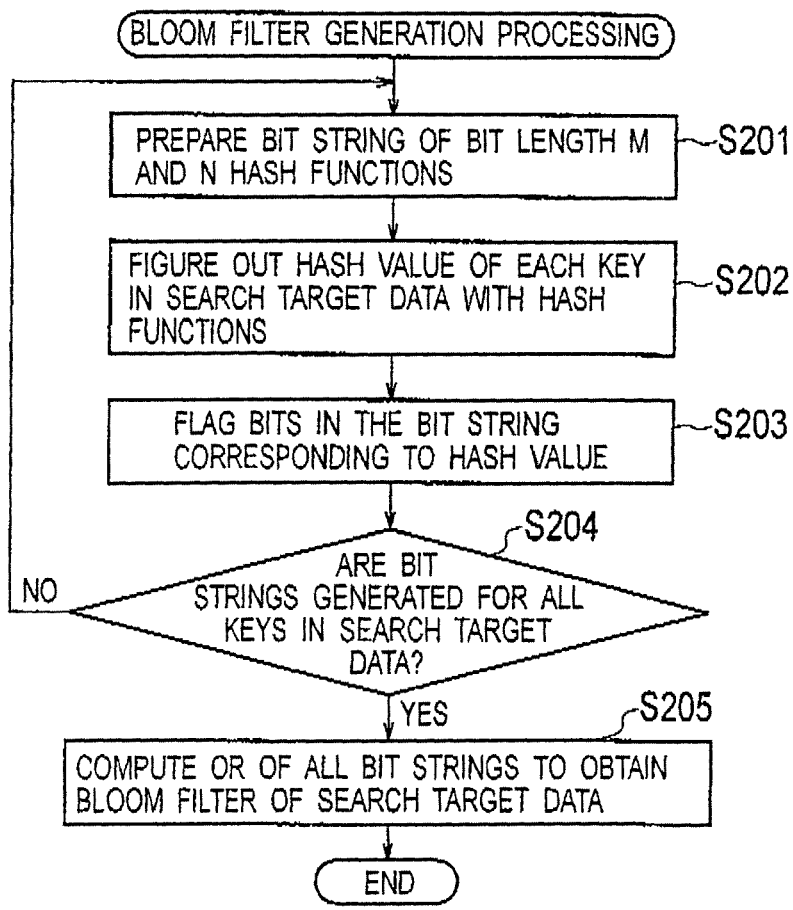
FIG. 1A is a flowchart showing a procedure of generating a Bloom filter used in an ad hoc network according to an embodiment of the present invention.

Hereinafter, embodiments of the present invention will be described with reference to the drawings. In the following description of the drawings, the same or similar reference numerals are attached to the same or similar elements.

(Bloom Filter)

Prior to an explanation of an ad hoc network according to an embodiment, a description will be given firstly for a Bloom filter used in the ad hoc network according to this embodiment, by using an example of string search. Firstly, a procedure example of generating a Bloom filter is described by referring a flowchart shown in FIG. 1A.

In step S201 of FIG. 1A, a bit string having a bit length of M bits and N hash functions are prepared (N and M denote integers at least 2). In addition, all the bits of the bit string are set to "0" in an initial state, and a hash value takes a value within a range of 1 to M. In an example of FIG. 2, a bit string of 10 bits and three hash unctions are used.

In step S202, a hash value of each key in search target data is figured out with the hash functions prepared in step S201. In FIG. 2, the search target data is "ad hoc network," and contains keys of "mobile," "ad hoc" and "network." The key "mobile" has a hash value 1, 10, 6 determined with the three hash functions.

In step S203, "1" is set in bits in the bit string corresponding to the hash value of each key figured out in step S202. In FIG. 2, the key "mobile" has the hash value 1, 10, 6 determined with the three hash functions, the 1-st, 6-th and 10-th bits are set to "1" in the bit string of the key "mobile."

In step S204, a judgment is made as to whether or not the bit strings are generated for all the keys in the search target data. If the bit strings are generated for all the keys in the search target data, the processing moves to step S205. If the bit strings are not generated for all the keys in the search target data, the processing moves back to step S201. As a result, the processing in steps S201 to S203 is carried out for all the keys in the search target data. In FIG. 2, bits corresponding to the hash value 7, 1, 6 of the key "ad hoc," and bits corresponding to the hash value 8, 3, 2 of the key "network" are set to "1."

In step S205, an OR of the bit strings of the respective keys generated in step S204 is computed, and thus a Bloom filter is generated. In FIG. 2, a Bloom filter "1110011101" of "ad hoc network" is generated by performing a logical OR operation on the bit string "1000010001" of the key "mobile," the bit string "1010001000" of the key "ad hoc" and the bit string "0110000100" of the key "network."

Figure 1B:
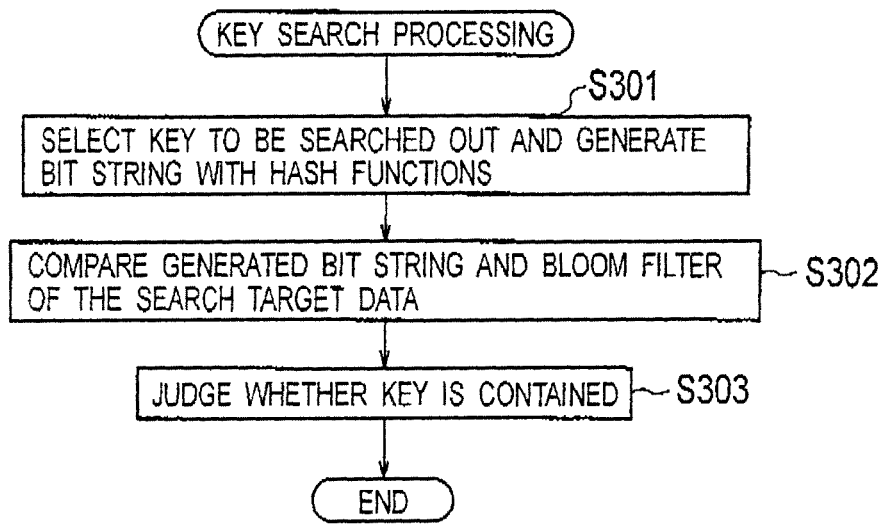
FIG. 1B is a flowchart of a procedure of searching out a key in a Bloom filter.

Next, a usage example of the Bloom filter will be described using, as an example, a case where a key is searched out in a character string with reference to a flowchart shown in FIG. 1B.

In step S301 in FIG. 1B, the hash value of a key to be searched out (called a search key, below) is figured out with the hash functions used to generate the Bloom filter. Then, the bit string of the key based on the hash value is generated as is the case with step S203 in FIG. 1A. In FIG. 2, assuming that the search key is "ad hoc," the bit string "1010001000" is generated in the same way as in step S203.

In step S302, the Bloom filter generated in step S205 in FIG. 1A and the bit string of the search key are compared with each other. If bits in the Bloom filter in step S205 are set to 1 (hereinafter, simply termed as "flagged") in all the same positions as those of the flagged bits in the bit string of the search key, the search target data may contain the search key. Conversely, if there is even one bit not flagged in the same positions in the Bloom filter, it is sure that the search target data does not contain the search key. In FIG. 2, the Bloom filter "1110011101" of the search target data "ad hoc network" and the bit string "1010001000" of the search key "ad hoc" are compared with each other. As shown in FIG. 2, in the Bloom filter "1110011101" of the search target data "ad hoc network," the bits are flagged in all the same positions of those of the flagged bits of the bit string "1010001000" of the search key "ad hoc". Accordingly, it can be considered that the search target data "ad hoc network" contains the search key "ad hoc."

The expression "may contain" in step S302 indicates that other several keys may cause flagged bits in a Bloom filter to completely overlap with flagged bits in the bit string of a search key, because the logical OR operation is performed in step S205. In this way, a Bloom filter stochastically allows a judgment that "a search key exists in search target data although it does not in fact."

(Ad Hoc Network)

In the ad hoc network of this embodiment, a Bloom filter is used in a routing protocol of the ad hoc network. As described above, the Bloom filter is an algorithm for judging only the existence of a key by using a compact data structure at a high speed. The Bloom filter employs such a compact data structure while stochastically allowing a judgment that a key exists although it does not. The Bloom filter is a bit string composed by converting each key to a bit string with hash functions, and then by performing a logical OR operation on these bit strings.

Figure 3:
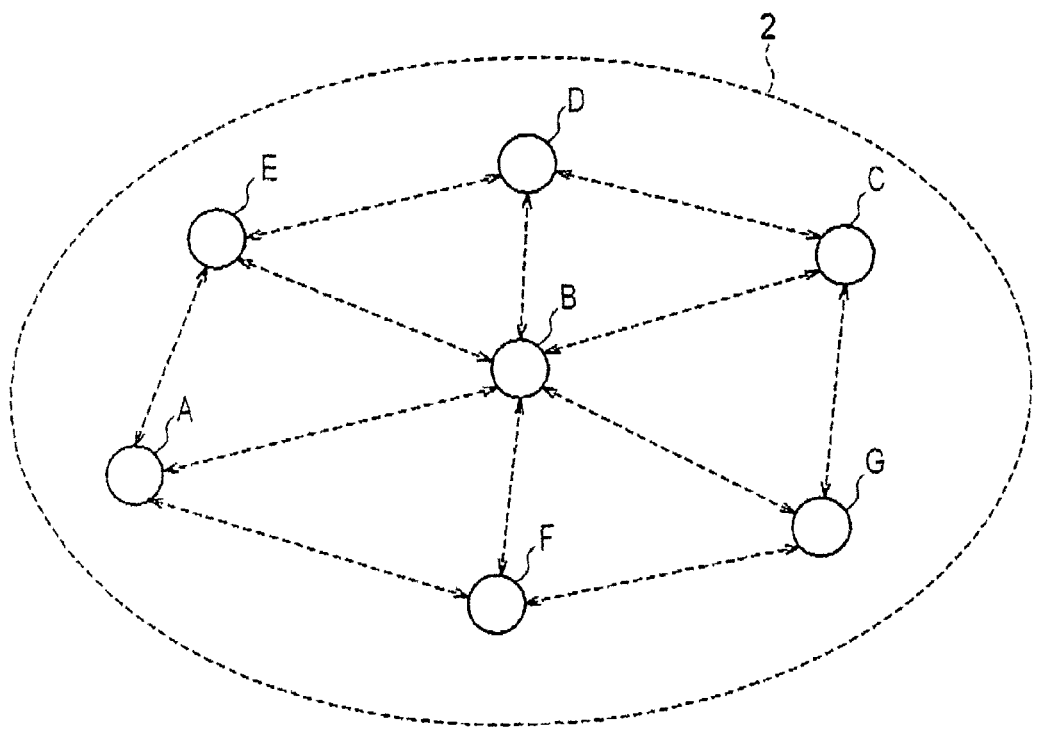
FIG. 3 is a network configuration diagram showing an example of the ac hoc network according to the embodiment of the present invention.

In an example of FIG. 3, an ad hoc network 2 is formed of a plurality of nodes A to G. Each of the nodes A to G includes hardware resources such as a CPU, a storage device and an input/output device, and software resources stored in the storage device. Each of the nodes A to G is not limited to a mobile communication terminal such as a mobile phone, for example, and a sensor and the like may be used as a node. Each of the nodes A to G has links with adjacent nodes.

In this embodiment, a node identification (node ID) is used as a key for generating the Bloom filter, and each of the nodes A to G is identified uniquely with its node ID. The information on the nodes A to G in the ad hoc network 2 is stored in the Bloom filter by using a plurality of hash functions. A bit string having a fixed bit length, as described above, is used as the Bloom filter in this embodiment. Moreover, an appropriate number of hash functions are used.

Each of the nodes A to G holds a Bloom filter for each link. The node ID of a node existing in a linked destination is stored in a corresponding Bloom filter. Each of the nodes A to G refers to the Bloom filter as routing information at a time of data transmission. More precisely, each node compares the bit string generated from the node ID of a destination node with the Bloom filter of each link. Then, when flagged bits (of "1") in the bit string of the node ID of the destination node are located in the same positions as those of flagged bits in some of the Bloom filters, the node transmits data to all the corresponding links.

Each of the nodes A to G updates the Bloom filters according to the following algorithm. When there is a change (a participation or withdrawal of another node) in the links and the Bloom filters owned by each of the nodes, the node transmits an update request message to all the links except the changed link. In addition, a unique message ID is added to the update request message, and nodes receiving the update request message each transmit a response indicating whether or not to accept the update.

The node accepting the update updates the Bloom filter, and then forwards the update request message to all the links except the link through which the received update request message is received. Each node exchanges Bloom filters with corresponding nodes, and thus carries out the updating of the Bloom filters.

According to the foregoing algorithm each of the nodes A to G can aggregately store, in the Bloom filters, the routing information on nodes existing in the ad hoc network 2.

In comparison with the reactive type routing protocol, in the ad hoc network 2 according to this embodiment, overheads and delay do not occur, which might be caused by flooding after a request to transmit data is made, and thereby the network load at a time of data transmission can be minimized. In addition, since the routing information held by each node is only one Bloom filter per adjacent node, the information volume held by each node can be made compact.

Moreover, the algorithm of this embodiment is simpler than the Dijkstra's algorithm used in a proactive-type routing protocol and the like, and thus the processing volume of each node can be reduced.

(Node)

Figure 4:
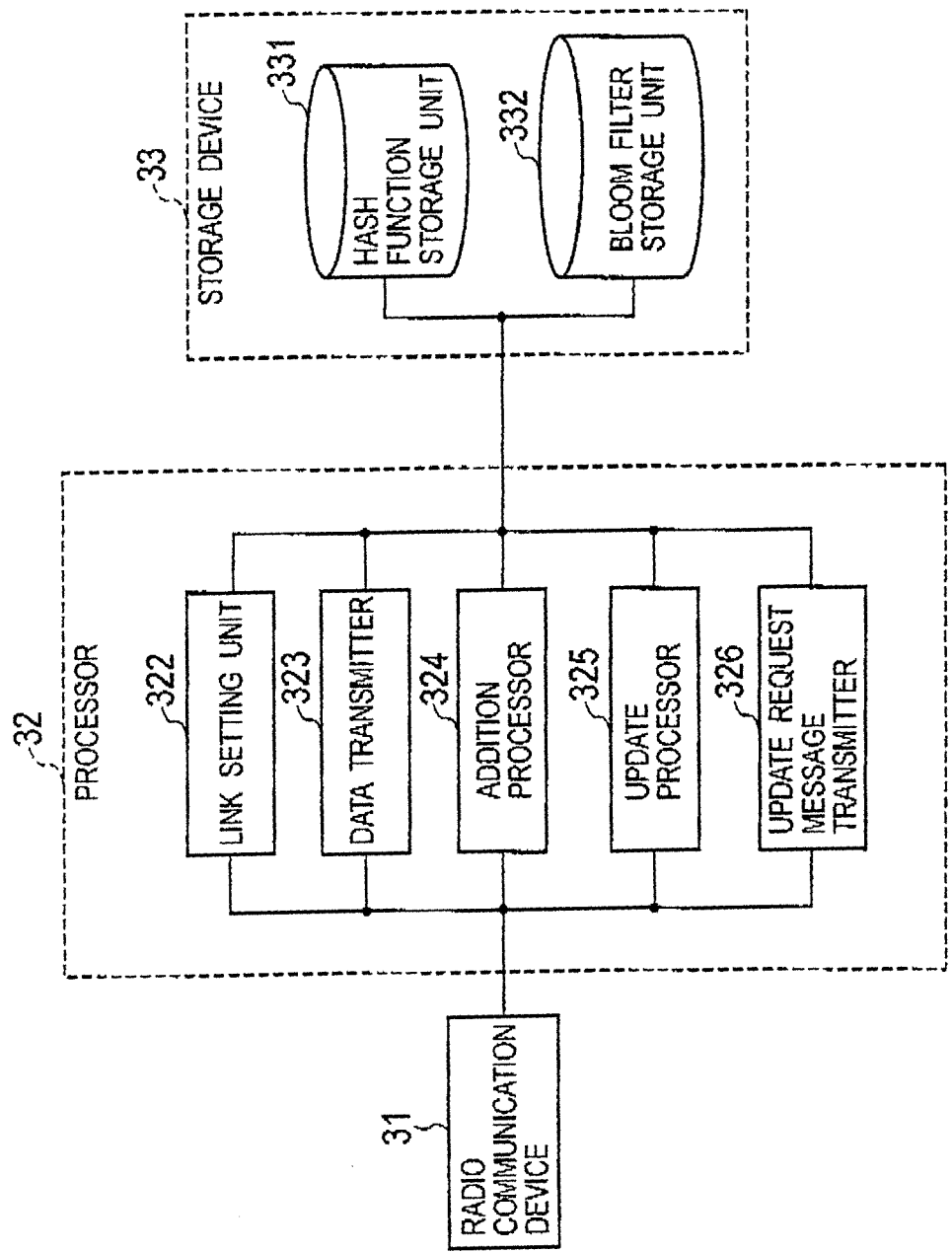
FIG. 4 is a block diagram showing a configuration example of a node in the ad hoc network according to the embodiment of the present invention.

FIG. 4 shows a configuration example of each of the nodes A to G. A node shown in FIG. 4 includes a radio communication device 31, a processor 32 and a storage device 33. The radio communication device 31 performs radio communications by using, for example, a wireless LAN, Bluetooth or the like. The storage device 33 includes a hash function storage unit 331 configured to prestore a plurality of hash functions therein, and a Bloom filter storage unit 332 configured to store Bloom filters. Specifically, in association with each of links, the Bloom filter storage unit 332 stores a Bloom filter generated by using, as a key, a node ID uniquely identifying each of nodes existing in ked destinations.

The processor 32 includes a link setting unit 322, a data transmitter 323, an addition processor 324, an update processor 325 and an update request message transmitter 326. The link setting unit 322 is configured to set a plurality of links to a plurality of adjacent links on a one-to-one base.

The data transmitter 323 uses, as the routing information, the Bloom filters stored in the Bloom filter storage unit 332 at a time of data transmission. Specifically, the data transmitter 323 makes a comparison with a Bloom filter of each link stored in the Bloom filter storage unit 332 by using the node JD of a data destination node as a search key. Then, according to the comparison result, the data transmitter 323 selects links to which the data is to be transmitted, among the plurality of links.

The addition processor 324 receives a bit string from a participating node that newly participates in the ad hoc network, and the bit string is one obtained by conversion of the node ID of the participating node. In a case of receiving the bit string, the addition processor 324 adds the received bit string to the Bloom filter storage unit 332 as a Bloom filter corresponding to the link to the participating node. Moreover, the addition processor 324 transmits, to the participating node, a result of computation using the Bloom filters of the respective links except the participating node, and using the bit string obtained by conversion of its own node ID.

When there is a change in any of the links to the adjacent nodes, the update request message transmitter 326 transmits an update request message to the links except the changed link.

When receiving an update request message requesting an update of the Bloom filter from an adjacent node, the update processor 325 judges whether or not to update the Bloom filter stored in the Bloom filter storage unit 332, and updates the Bloom filter stored in the Bloom filter storage unit 332 in response to an affirmative judgment result. Moreover, when updating the Bloom filter, the update request message transmitter 326 transmits the update request message to each of the links except the link corresponding to the updated Bloom filter.

In addition, when the update request is accepted, the update request message transmitter 326 transmits, to the node accepting the update request, a result of computation using a Bloom filter of each of the links except the link to the node accepting the update request, and using the bit string obtained by conversion of its own node ID.

(Node Participation Processing)

Figure 5A:
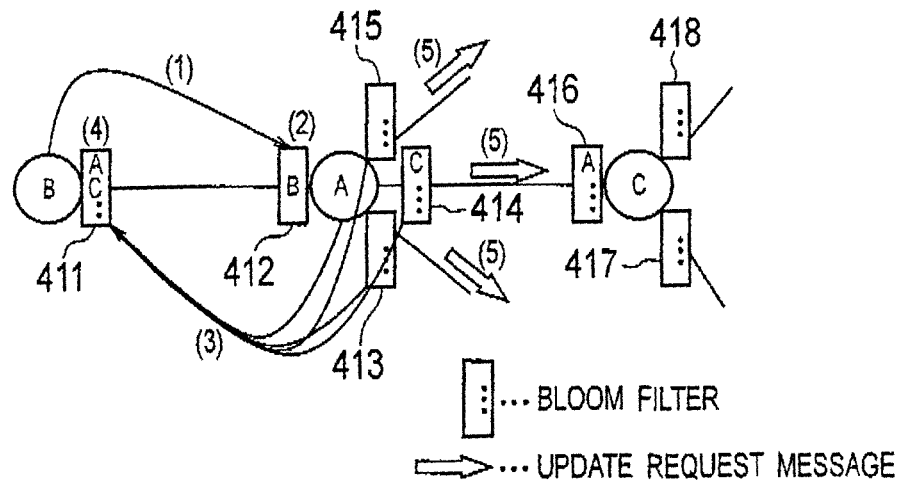
FIG. 5A is a network configuration diagram for explaining node adding processing in the ad hoc network according to the embodiment of the present invention.

Subsequently, by referring to a configuration diagram in FIG. 5A and a flowchart in FIG. 5B, a description will be given for a case where a node newly participates in a network, that is, a case of updating the Bloom filter to be used for a link between the newly participating node and a connect node to which the participating node is connected. In FIG. 5A, the participating node B is corrected to the connect node A, and the Bloom filters are updated through exchanges of bit strings between the two nodes.

Figure 5B:
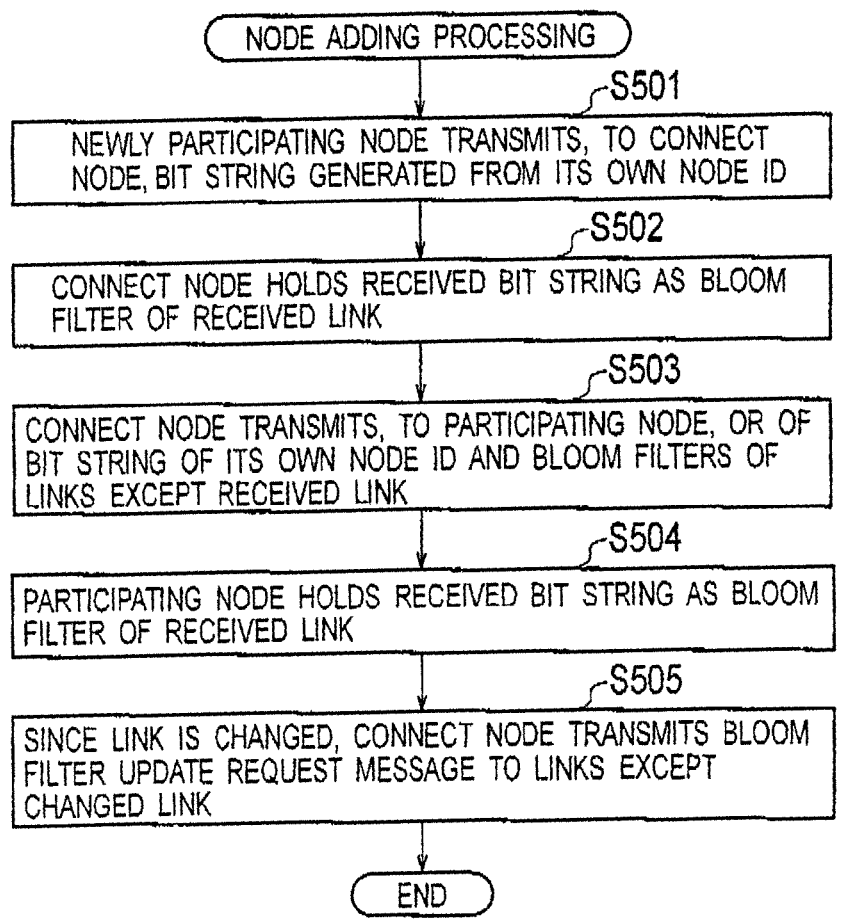
FIG. 5B is a flowchart showing a procedure of the node adding processing in the ad hoc network according to the embodiment of the present invention.

(1) In step S501 of FIG. 5B, the participating node figures out the hash value of its own node ID by using the hash functions. Thereafter, the participating node generates the bit string (Bloom filter) from the hash value and transmits the bit string to the connect node. In FIG. 5A, the participating node B generates the bit sting from the node ID, and transmits the bit string to the connect node A.

(2) In step S502, the connect node holds the bit string received in step S501 as the Bloom filter of the received link. In FIG. 5A, the connect node A holds the received bit string as the Bloom filter 412 for the link to the node B.

(3) In step S503, the connect node computes an OR of the bit string generated from its own node ID, and the Bloom filters of the links except the link through which the bit string is received in step S502, and then transmits the bit string of the computed OR to the participating node. In FIG. 5A, the connect node A computes an OR of the bit string generated from its own node ID, and the Bloom filters 413 to 415 of the links except the link through which the bit string is received (hereinafter, such a link is also simply called a "received link") in step S502, and then transmits the bit string of the computed OR to the participating node B.

(4) In step S504, as the Bloom filter of the received link, the participating node holds the bit sting received from the connect node in step S503. In FIG. 5A, as the Bloom filter 411 of the received link, the participating node B holds the bit string received from the connect node A.

(5) In step S505, since there is a change in its own links, the connect node transmits an update request message to the links except the changed link. In FIG. 5A, the node A has a link changed, and accordingly transmits an update request message to each of the links except the changed link.

(Bloom Filter Update Processing)

Figure 6A:
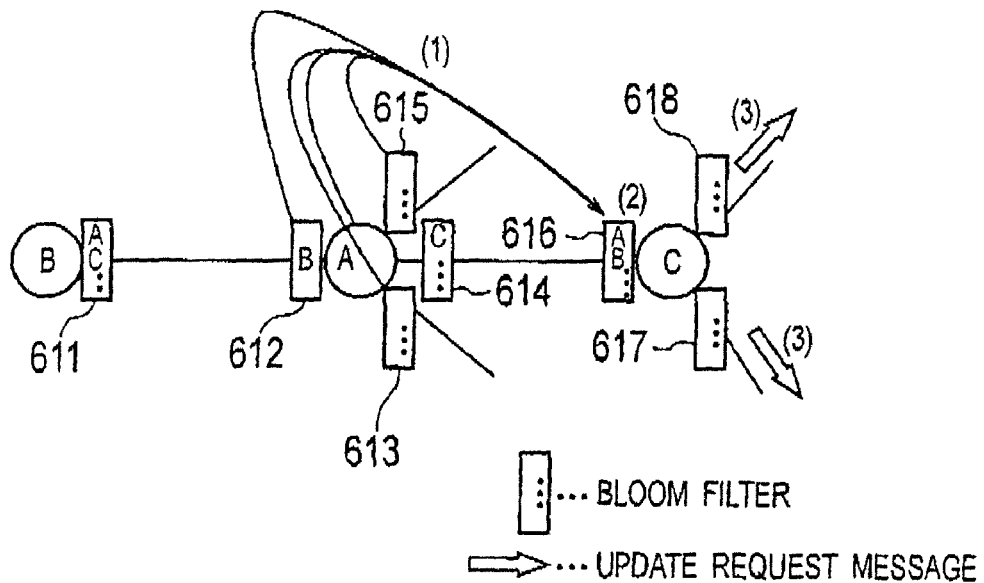
FIG. 6A is a schematic diagram for showing Bloom filter updating processing in the ad hoc network according to the embodiment of the present invention.
Figure 6B:
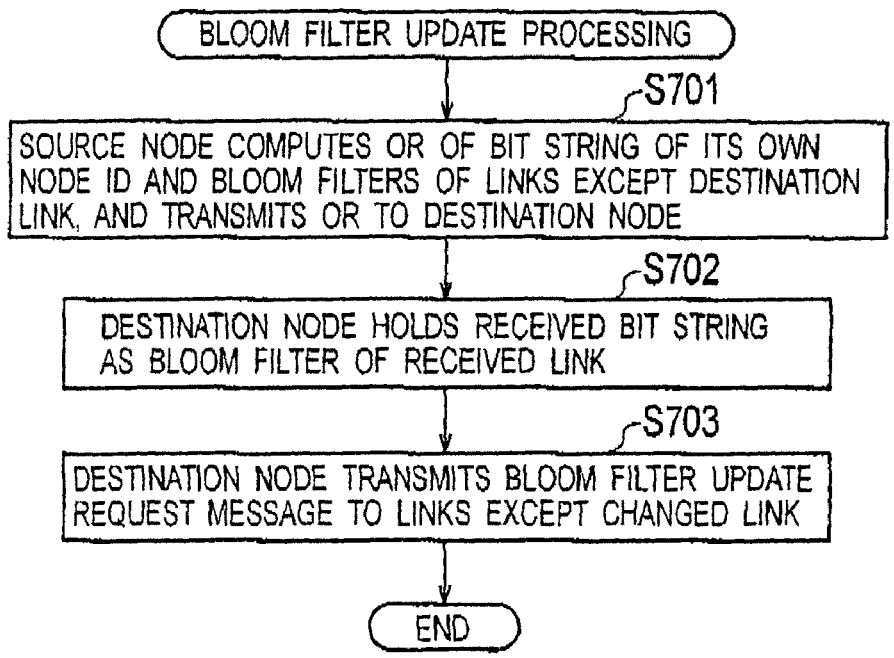
FIG. 6B is a flowchart showing a procedure of the Bloom filter updating processing in the ad hoc network according to the embodiment of the present invention.

Here, with reference to a configuration diagram of FIG. 6A and a flowchart of FIG. 6B, a description will be provided for a case of receiving an update request massage and of accepting the update. FIG. 6A illustrates an example in which a node C receives an update request message from a node A and accepts the update.

(1) In step S701 in FIG. 6B, a source node figures out the hash value of its own node ID by using bash functions. Then, the source node computes an OR of the bit string generated from the hash value, and Me Bloom filters of the links except a destination link, and then transmits the bit string of the computed OR to the destination node. In FIG. 6A, the node A computes an OR of the bit string generated from its own node ED, and the Bloom filters 612, 613 and 615 of the links except the destination link, and then transmits the bit string of the computed OR to the node C.

(2) In step S702, as a Bloom filter for the received link, the destination node holds the bit string received in step S701. In FIG. 6A, the node C holds the bit string received from the node A, as a Bloom filter 616 for the link to the node A.

(3) In step S703, since there is a change in the Bloom filters of its own links, the destination node transmits an update request message to the link except the changed link. In FIG. 6A, since the Bloom filter 616 held by the node C is changed, the node C transmits an update request message to each of the links except the changed link.

(Node Withdrawal Processing)

With reference to a configuration diagram of FIG. 7A and a flowchart of FIG. 7B, a description will be provided below for a case where a node withdraws from a network. FIG. 7A shows a case where a node B withdraws from an ad hoc network, and where a node A detects the withdrawal of the node B.

(1) In step S901, upon detection of a withdrawal of an adjacent node, a node transmits a message requesting for Bloom filter update to all the links. In FIG. 7A, the node A detects the withdrawal of the node B, and transmits a message requesting for Bloom filter update to all the links.

(Data Transmission Processing)

A procedure at a time of data transmission will be described below. At the time of data transmission, a data source node that is about to transmit data designates its destination with the node ID. The procedure will be described below with reference to a flowchart of FIG. 8.

In step S1001, the data source node generates a bit string by using the node ID of the destination and hash functions. The hash functions and the number of bits in the Bloom filter used here are the same as those used in the Bloom filter update.

In step S1002, the date source node compares the bit string generated in step S1001 with the Bloom filters for the respective links held by the source node.

In step S1003, the data source node checks whether or not bits in the compared Bloom filter are flagged in the same positions of those of flagged bits in the bit string generated in step S1001. If flagged, the processing moves to step S1004. If not flagged, the data source node compares the bit string with the Bloom filter of another link.

In step S1004, the source node considers that the destination node probably exists in a linked destination, and transmits the data.

(Other Embodiments)

Although the present invention has been described above by using the embodiment, it should not be understood that the descriptions and the drawings, which are part of this disclosure, limit the present invention. It is obvious to those skilled in the art from this disclosure how to obtain various alternative embodiments, examples and applied techniques.

For example, according to the method of the aforementioned embodiment, every time a change occurs in a network structure, an update request message to be responded by each of nodes flows on the network. Accordingly, the following conditions may be added to the operation for Bloom filter update for the purpose of optimizing the communications traffic.

(Condition 1) When a node receives a Bloom filter update request message whose message ID is identical to the message ID of a previously received Bloom filter update request message, the node neither updates the Bloom filter nor forwards the message.

(Condition 2) When a node receives, from another node, a Bloom filter that is identical to a Bloom filter held for the same received link, the node neither updates the Bloom filter nor forwards the message.

(Condition 3) When a node receives a Bloom filter from another node, and when the bits in the bit string generated from its own node ID are flagged in a the same positions as those of flagged bits in the Bloom filter, the node neither updates the Bloom filter nor forwards the message.

In this way, it should be understood that the present invention also includes various embodiments and the like which are not described here. Accordingly, the present invention is limited only by the scope of the invention as defined by the appended claims appropriate for this disclosure.

What is claimed is:

1. An ad hoc network including a plurality of nodes, each node comprising:
   a memory to store a plurality of Bloom filters, each Bloom filter being associated with a respective communication link and based on a unique node identifier of each destination node associated with the respective communication link;
   a processor configured to
      receive a bit string from a new participating destination node via a new communication link,
      set a communication link to each of a plurality of destination nodes including the new communication link, for each destination node that communicates with the node, on a one-to-one basis, and
      compute an OR function of a bit string generated from a unique identifier of the node and each of the Bloom filters associated with the set communication links other than the new communication link, to produce a new Bloom filter; and
   a radio communication device to transmit the new Bloom filter to the new participating node and transmit data based on the Bloom filters as routing information.

2. A node in an ad hoc network including a plurality of nodes, the node comprising:
   a memory to store a plurality of Bloom filters, each Bloom filter being associated with a respective communication link and based on a unique node identifier of each destination node associated with the respective communication link;
   a processor configured to
      receive a bit string from a new participating destination node via a new communication link,
      set a communication link to each of a plurality of destination nodes including the new communication link, for each destination node that communicates with the node, on a one-to-one basis, and
      compute an OR function of a bit string generated from a unique identifier of the node and each of the Bloom filters associated with the set communication links other than the new communication link, to produce a new Bloom filter; and
   a radio communication device to transmit the new Bloom filter to the new participating node and transmit data based on the Bloom filters as routing information.

3. The node according to claim 2, wherein the processor is further configured to transmit an update request message to update Bloom filters update when there is a change in a communication link associated with an updates one of the Bloom filters, the update request message transmitted to each of the communication links other than the changed communication link.

4. The node according to claim 2, wherein the processor is further configured to judge whether or not to update one of the stored Bloom filters when receiving an update request message requesting a Bloom filter update, to update the one of the stored Bloom filters in response to an affirmative judgment result, and to transmit an update request message to each of the communication links other than the communication link associated with the updated one of the Bloom filters.

5. The node according to claim 3 or 4, wherein the processor is further configured to, when the update request message is accepted, transmit a result of a computation to a node accepting the update request, the computation including an OR function of the bit string generated from the unique identifier of the node and each of the Bloom filters associated with the respective communication links other than the communication link to the destination node accepting the update request.

6. The node according to claim 2, wherein
   the Bloom filters each comprise a Bloom filter bit string including a sequence of flagged bits and un-flagged bits, and
   the radio communication device is further configured
      to compare a destination node bit string generated from a node identification ID with each of the Bloom filters, the destination node bit string including a sequence of flagged bits and un-flagged bits, and,
      for each of the set communication links for which bits of the Bloom filter associated with the set communication link are flagged at each same respective position as flagged bits of the destination node bit string, to transmit data on the set communication link.

7. A routing control method applied to an ad hoc network configured of a plurality of nodes, comprising the steps of:
   storing a plurality of Bloom filters, each Bloom filter being associated with a respective communication link and based on a unique node identifier of each destination node associated with the respective communication link;

receive a bit string from a new participating destination node via a new communication link;

setting a communication link to each of a plurality of destination nodes including the new communication link, for each destination node that communicates with the node, on a one-to-one basis;

computing an OR function of a bit string generated from a unique identifier of the node and each of the Bloom filter associated with the set communication links other than the new communication link, to produce a new Bloom filter; and transmitting the new Bloom filter to the new participating node and transmit data based on the Bloom filters as routing information.

8. A non-transitory computer-readable storage medium storing therein a routing control program which, when executed by a processor, directs a node of an ad hoc network to execute a process, comprising:

storing a plurality of Bloom filters, each Bloom filter being associated with a respective communication link and based on a unique node identifier of each destination node associated with the respective communication link;

receive a bit string from a new participating destination node via a new communication link;

setting a communication link to each of a plurality of destination nodes including the new communication link, for each destination node that communicates with the node, on a one-to-one basis;

computing an OR function of a bit string generated from a unique identifier of the node and each of the Bloom filter associated with the set communication links other than the new communication link, to produce a new Bloom filter; and transmitting the new Bloom filter to the new participating node and transmit data based on the Bloom filters as routing information.

* * * * *